United States Patent
Kaidi (10) Patent No.: US 11,811,822 B2
(45) Date of Patent: Nov. 7, 2023

(54) SYSTEMS AND METHODS FOR DETECTING AND AUTOMATICALLY BLOCKING MALICIOUS TRAFFIC

(71) Applicant: PayPal, Inc., San Jose, CA (US)

(72) Inventor: George Chen Kaidi, Singapore (SG)

(73) Assignee: PAYPAL, INC., San Jose, CA (US)

( * ) Notice: Subject to any disclaimer, the term of this patent is extended or adjusted under 35 U.S.C. 154(b) by 228 days.

(21) Appl. No.: 16/903,613

(22) Filed: Jun. 17, 2020

(65) Prior Publication Data

US 2021/0400080 A1    Dec. 23, 2021

(51) Int. Cl.
| | |
|---|---|
| G06F 21/00 | (2013.01) |
| H04L 9/40 | (2022.01) |
| G06N 20/00 | (2019.01) |

(52) U.S. Cl.
CPC ......... H04L 63/1458 (2013.01); G06N 20/00 (2019.01); H04L 63/0254 (2013.01); H04L 63/0281 (2013.01); H04L 63/1425 (2013.01)

(58) Field of Classification Search
CPC ............. H04L 63/1458; H04L 63/0254; H04L 63/0281; H04L 63/1425; H04L 63/0236; H04L 63/0263; H04L 63/0876; G06N 20/00
See application file for complete search history.

(56) References Cited

U.S. PATENT DOCUMENTS

| | | | |
|---|---|---|---|
| 8,413,238 B1* | 4/2013 | Sutton | H04L 63/1441 709/224 |
| 10,902,327 B1* | 1/2021 | Yalov | G06N 5/025 |
| 11,138,463 B1* | 10/2021 | Wang | G06K 9/6223 |
| 2014/0047542 A1* | 2/2014 | Holloway | H04L 63/1433 726/23 |
| 2016/0173529 A1* | 6/2016 | Baig | H04L 63/1408 726/13 |
| 2018/0069878 A1* | 3/2018 | Martini | G06F 21/567 |
| 2018/0316705 A1* | 11/2018 | Tsironis | H04L 41/142 |
| 2019/0036883 A1* | 1/2019 | Bergman | H04L 63/0245 |
| 2019/0081854 A1* | 3/2019 | Pham | G06F 21/56 |
| 2019/0306182 A1* | 10/2019 | Fry | H04L 63/1425 |
| 2019/0312897 A1* | 10/2019 | Wang | H04L 63/1433 |
| 2019/0387005 A1* | 12/2019 | Zawoad | H04L 63/1425 |
| 2020/0007548 A1* | 1/2020 | Sanghavi | H04L 63/0209 |
| 2020/0169577 A1* | 5/2020 | Oh | G06N 20/00 |
| 2020/0412761 A1* | 12/2020 | Luo | H04L 63/1458 |
| 2021/0409442 A1* | 12/2021 | Heydari | H04L 63/1441 |

* cited by examiner

*Primary Examiner* — Michael M Lee
(74) *Attorney, Agent, or Firm* — HAYNES AND BOONE, LLP (57) ABSTRACT

Methods and systems are presented for detecting and automatically blocking malicious traffic directed at a service provider. An IP address associated with a domain of the service provider is dissociated from the domain. Requests addressed to the IP address after it has been dissociated are identified as malicious and logged. IP addresses from which the malicious requests originated are blocked, and the log of malicious requests is used to train a model for determining pattern-based rules. Rules for managing traffic are determined based on the patterns and pushed to nodes of a proxy service, and the nodes may block or otherwise limit requests based on the rules.

20 Claims, 6 Drawing Sheets

SYSTEMS AND METHODS FOR DETECTING AND AUTOMATICALLY BLOCKING MALICIOUS TRAFFIC

BACKGROUND

The present specification generally relates to online security, and more specifically, to detecting and automatically blocking malicious traffic directed at a service provider.

RELATED ART

An online service provider may be targeted by malicious actors seeking to prevent the service provider from providing services to legitimate users or exploit the service provider for financial gain. For example, a malicious actor may launch a distributed denial of service (DDoS) attack against the service provider designed to take the service provider's website offline or hamper the functionality of the website. In such an attack, a malicious actor may use a script that sends a large number of requests to the service provider's website. The requests may overwhelm the website, preventing the website from responding to requests from legitimate users, or taking the website offline altogether. An attacker may also use a script to try to gain access to the accounts of users serviced by the provider. After gaining access, the attacker may attempt to steal funds from the users' accounts or fraudulently place orders using the accounts.

Online service providers may attempt to mitigate such an attack based on the IP address at which the attack originates. For example, the service provider may block requests from an IP address associated with malicious activity or apply a rate limit specifying an allowable number of requests over a period of time from an IP address before the IP address is blocked from further requests. Such mitigation efforts, however, may negatively impact legitimate users. For example, users at a large institution may share a single public-facing IP address. A single malicious actor at the institution may cause requests from the shared IP address to be blocked or rate-limited, impacting authorized or legitimate users at the same institution sharing the IP address. Furthermore, an attacker may distribute the attack over multiple IP addresses to reduce the effectiveness of the service provider's mitigation efforts. For example, the attacker may launch the attack from multiple IP addresses associated with the attacker's machine, or the attacker may take control of the machines of authorized or legitimate parties—each associated with one or more IP addresses—and form a botnet from which to launch the attack. The number of machines under an attacker's control may be substantial, leading to hyper-distributed attacks involving hundreds of thousands of IP addresses. Thus, there is a need for developing improved methods of detecting attacks of the kind described and reduce their likelihood of success while reducing the impact of any attack mitigation measures on legitimate users of a service.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for accurately detecting malicious traffic directed at a service provider and automatically blocking or otherwise impeding the malicious traffic. As discussed above, a service provider may be the target of an attack designed to impair the service provider's ability to serve legitimate users, attacks designed to again access to user accounts, or other forms of attack designed to exploit the service provider for financial or other gain. As an example, consider a DDoS attack against a service provider where an attacker has control of ten thousand IP addresses. A service provider may defend against such an attack by applying a rate limit to incoming requests, specifying, for example, that any IP address which exceeds 10 requests in a minute will be blocked. The DDoS attack may be effectively stopped if each IP address under the attacker's control sends more than 10 requests in a minute, as the service provider would rate-limit the IP addresses associated with the attack, blocking requests from the IP addresses once they exceed the rate limit. The attacker, however, may be able to discover the rate limit by trial and error (e.g., by increasing or decreasing the rate at which requests are sent until requests are blocked or no longer blocked). Once the attacker discovers the rate limit is 10 requests/minute, the attacker could configure the script to issue 9 requests/minute without being blocked. The effectiveness of the attack would be reduced, but the attacker could simply increase his pool of IP addresses and keep the rate of requests from each IP address under the rate limit to maintain the same level of effectiveness. Accordingly, embodiments of the present disclosure allow a service provider to determine that an IP address is associated with malicious traffic with a very high degree of confidence, even in situations where an attacker has discovered and circumvented a rate limit.

A legitimate user accessing a service at a service provider would usually do so using the domain name (e.g., paypal.com) associated with the service provider. For example, a legitimate user would enter a full or partial uniform resource locator (URL) containing the domain name "paypal.com" into their web browser to access the PayPal website, or search for "PayPal" using a search engine, which would provide a link that includes the paypal.com domain name. After the user has entered the URL or followed the link provided by the search engine, the web browser may obtain an IP address associated with the domain name using a domain name system (DNS), and access the PayPal website using the IP address. Any time the user follows a link on the PayPal website, the browser would again retrieve an IP address associated with PayPal using the DNS. If for any reason, the IP address changed, a query to the DNS would return the updated IP address, ensuring the user has uninterrupted access to the website. In some instances, however, an attacker may wish to directly target an IP address, rather than making requests based on the domain name. For example, it may be faster to retrieve the IP address once (e.g., using a ping or nslookup utility) and use it in subsequent requests than making a request based on the domain name that needs to be resolved by a DNS every time. Or the service provider may rely on a proxy service with multiple geographically distributed nodes (e.g., a content delivery network (CDN) with geographically distributed edge servers), and the attacker may wish to target a particular node. Embodiments of the present disclosure may identify malicious traffic based on a request being initiated using an IP address rather than a domain name.

IP addresses may be shared among multiple users. For example, multiple users at a large institution such as a university may share a single public-facing IP address. When IP addresses are shared, associating the shared IP address with malicious activity and blocking or otherwise limiting requests from the shared IP address may adversely impact legitimate users of a service who share the IP address with a malicious user. A service provider may identify IP addresses associated with malicious traffic, compile the IP addresses, and transmit them to a proxy service to be blocked. The proxy service may include a web application firewall (WAF). For example, the service provider may detect that an IP address is associated with login attempts to different accounts, and that each of the different accounts has received login attempts from multiple IP addresses, indicating a distributed attack designed to compromise user accounts. The service provider may transmit a list of IP addresses involved in the attack to the proxy service to be blocked. However, innocent users sharing an IP address on the list may be blocked as well, and the process of compiling and transmitting the list may be slow, particularly compared with how quickly an attacker may be able to switch IP addresses. By the time the proxy service is blocking requests from an IP address, the attacker may no longer be using that IP address, but legitimate users may be blocked. Accordingly, other methods of identifying malicious traffic beyond association with an IP address are desirable. Embodiments of the present disclosure allow a security system to determine patterns characteristic of malicious traffic and dynamically create and activate rules to block or inhibit the malicious traffic, without the latency that may be associated with IP block lists. The patterns may be used to create rules that are pushed to a proxy service for blocking traffic associated with the patterns, and/or they may be used to train a machine learning model, as described below. The patterns may be determined or validated in part by analyzing traffic from IP addresses known to be generating malicious traffic, using the methods described below.

In some embodiments, a service provider may have multiple IP addresses associated with a domain (e.g., paypal.com). The service provider may periodically dissociate an IP an address from the domain while still receiving and logging traffic at the IP address. For example, the service provider may still receive requests directed to the IP address, but may not respond to them. As a result of dissociating the IP address from the domain, a DNS query for the IP address associated with a domain name would return a new IP address rather than the dissociated one. A legitimate user of the service (relying on the domain name to reach the service) would thus experience no service interruption as a result of dissociating the IP address. An attacker targeting a specific IP address, however, would begin receiving errors (e.g., 504 timeout errors) after sending requests to the service provider. Moreover, all requests directed at the dissociated IP address received after the dissociation can reliably be identified as malicious. The service provider may rotate different IP addresses in and out of being associated with the domain, triggering the collection and identification of malicious requests.

A system (e.g., a system controlled by the service provider) may receive, at a first node of one or more nodes associated with a domain, a first set of one or more requests. The first node may be associated with a first IP address associated with the domain (e.g., controlled by the service provider), and each request in the first set may be associated with a source IP address (i.e., the IP address from which the request originated). The one or more nodes may be servers operated by the service provider, or they may be nodes of a proxy service. For example, the service provider may rely on a CDN to provide low-latency access to users in different geographic regions, and each node may be an edge server of the CDN. The system may then dissociate the IP address from the domain. For example, the system may stop responding to any requests directed at the dissociated IP address from any of the one or more nodes, or the service provider may instruct the proxy service to stop responding to requests from the dissociated IP address. The system may then receive (and optionally log), at the first node (or at a different node), a second set of one or more requests. Each request in the second set of requests may be associated with the dissociated IP address (e.g., directed to the dissociated IP address), and with a source IP address (i.e., the address from which the request originated). Each request in the second set of requests may be associated with malicious activity based on being associated with the dissociated IP address. In other words, since a legitimate user would make requests based on the domain name of the service provider, a DNS would return a destination IP address other than the dissociated one for every request made by the user. An attacker, however, may target the IP address directly, circumventing the DNS after retrieving the IP address at an earlier point in time. Thus, the system may accurately assume that every request received at the dissociated IP address after it was dissociated from the domain originated from an attacker.

The system may create or update a list of IP addresses associated with malicious activity (referred to as malicious IP addresses herein), comprising the IP addresses of requests received as part of the second set of requests. The system may then block any requests originating from a malicious IP address. The system may instead (or an addition to blocking) flag each request from a malicious IP address for other action. For example, the flagged requests may be reviewed later to determine a rule or policy, or the system may issue a challenge (e.g., a CAPTCHA or other puzzle) which must be solved correctly before the system responds to the request. The system may also apply a rate limit to requests from malicious IP addresses, or apply a stricter rate limit to requests from malicious IP addresses than from other IP addresses. The system may also push the list of malicious IP addresses to the proxy service which may block, flag, or rate limit the requests. In some embodiments, the system may filter out shared IP addresses from the list of malicious IP addresses. For example, for an IP address identified as malicious, the system may analyze requests from the first set of requests to determine if the IP address is shared. The IP address may be determined to be shared, for example, if different requests from the same IP address included different user agents. If the system determines an IP address associated with a request in the second set of requests is shared, it may exclude the IP address from the list of malicious IP addresses. In some embodiments, the list of malicious IP addresses may include additional identifying information about a device in addition to the IP addresses. For example, the system may include a device fingerprint with each IP address in the list. The system may extract the browser version, operating system version, screen resolution and color depth, time zone, CPU and GPU information, etc. from the user agent or programmatically (e.g., by running a script on the user's device) to generate a device fingerprint. The system may then block, flag, or rate limit requests based on the device fingerprint rather than just the IP addresses, reducing the likelihood of legitimate users being penalized because they share an IP address with an attacker. In some embodiments, the rate limit may indicate a number of invalid requests over a period of time beyond which requests will be blocked. For instance, if the rate limit is 10 invalid requests per minute, requests associated with a device identifier (e.g., IP address and/or device fingerprint) may meet or exceed 10 valid requests in a minute without being blocked, but if the number of invalid requests exceeds 10 in a minute, further requests would be blocked.

In some embodiments, the system may block requests where the information contained in the user agent string does not match information about the device determined programmatically. For example, the system may receive a request including a user agent that indicates a web browser. The system may use a script (e.g., JavaScript code that runs in the web browser) to determine the actual web browser from which the request originated and determine that the actual browser and the one indicated in the user agent are different and block the request.

In some embodiments, the dissociated IP address may again be associated with the domain after a period of time has elapsed, and a different IP address may be dissociated from the domain name. For example, if the domain is associated with ten IP addresses, the system may be scheduled to dissociate one of the ten IP addresses for an interval of time, then re-associate the IP address with the domain once the interval has elapsed. After a period of time, the system may dissociate a different IP address of the ten for a time interval, then re-associate the IP address. In this manner, the system may cycle through the IP addresses associated with it, capturing malicious traffic in batches.

In some embodiments, the system may associate a source IP address with a threat score, and apply a block, flag, or rate limit only if the threat score meets or exceeds a threat score threshold. The system may increase the threat score associated with a source IP address or device fingerprint in response to receiving a request from the device associated from with the source IP address or fingerprint. For example, the system may assign each source IP address a threat score between 0 and 10, where 0 indicates a minimal threat and 10 indicates the most serious threat, and the system may use a threat score threshold of 7. Each source IP address from which a request is received may initially be assigned a threat score of 0. If the system receives a request from a source IP address at the dissociated IP (indicating the source IP address is associated with malicious activity), the system may increase the source IP address' threat score. For example, if the system determines the source IP address is shared with legitimate users, the system may increase the threat score of the source IP address from 0 to 5. If instead, the system determines the source IP address is used exclusively by an attacker, the system may increase the threat score of the source IP address from 0 to 10. When determining whether to block the IP address (e.g., based on a rule or an IP block list), the system may compare the threat score of the source IP address to the threshold. Since the threat score of the shared IP address is 5, which is less than the threshold of 7, the system may not block or otherwise penalize traffic from the shared IP address. However, since the threat score of the source IP address associated only with the attacker is 10, which is greater than the threshold of 7, the system may block all requests originating at the source IP address associated only with the attacker. In some embodiments, the system may also challenge (but not block) incoming requests based on the threat score. For example, the system may be configured to issue a CAPTCHA or other puzzle or test in response to any requests with a threat score between 5 and 6. In that case, the system may provide a challenge to requests originating at the shared IP address (since its threat score of 5 is between 5 and 6). If the challenge is successfully solved, the request may be allowed; otherwise, the request may be blocked.

Since each request directed at the dissociated IP address can be characterized as malicious with a very high degree of certainty, the malicious requests may serve as highly-accurate training or validation data for a machine learning (ML) model, and/or for automated pattern extraction. In some embodiments, an ML model may be trained utilizing log information corresponding to the set of malicious requests (i.e., requests received at the dissociated IP address). The training may include determining one or more patterns corresponding to malicious activity, as described below. For example, the ML model may be trained using the log information corresponding to the set of malicious requests. The system may then receive, at any of the one or more nodes, a new request corresponding to first information. The first information may include, for example, a request payload or a user agent. The system may determine whether the new request corresponds to malicious activity based on using the ML model to analyze the first information and determine if the first information corresponds to the one or more patterns. If the new request corresponds to malicious activity, the system may block the request. The new request may also be blocked an a per-endpoint basis. For example, the request may be received at a first endpoint, the system may determine that a pattern is associated with the first endpoint, and the system may block the request based on the first information corresponding to the first pattern and the new request being received at the first endpoint.

In some embodiments, the ML model may be used to determine rules for managing traffic, and the ML model may be trained by applying a rule designed to identify malicious requests to the malicious requests associated with the dissociated IP address. The system may then determine which, if any, malicious requests the rule(s) failed to identify. The system may then update the rule based on the malicious requests the rule failed to identify. For example, the system may update the rule based on a pattern extracted from characteristics common to the requests that were not properly identified as being malicious.

In some embodiments, the system may continue to respond to malicious requests addressed to a dissociated IP address rather than allowing the requests to time out or blocking the requests. The system may provide responses designed to elicit further requests from the source of the malicious requests without compromising the security of the system. For example, the system may respond to a request for user information directed at the dissociated IP address with information for a fictional user. The source of the malicious requests may then transmit additional requests based on the fictional response. Since the additional requests would also be directed at the dissociated IP address, they may be presumed malicious, logged, and analyzed, providing the system with a larger data set of requests reliably identified as malicious.

In some embodiments, the system may analyze the logged requests using an automated pattern extractor. As described below, the system may determine a pattern indicating malicious activity based on the analysis. The system may determine a rule for managing traffic based on the pattern, and push the rule to the proxy service (which may include a WAF). Unlike IP-address-based blocking which occurs in the transport or network layers (i.e., layers 4 and 3 of the open systems interconnection (OSI) model), the pattern-based blocking described in embodiments of this disclosure allow the system to block or otherwise mitigate malicious traffic at the application layer (layer 7 of the OSI model). Mitigating malicious traffic at the application layer allows the system to consider information contained in a request rather than merely an IP address. For example, the system may analyze the content of post requests (e.g., payloads and parameters), and block traffic reaching specific endpoints rather than imposing a blanket ban on all traffic from an IP address. Effectively, the system is better able to identify malicious requests, without being over inclusive and penalizing legitimate users that happen to share an IP address with an attacker.

The patterns determined by the system to develop rules or train the ML model may be based on the characteristics or contents of requests that have been identified as likely being malicious. For example, the requests may be identified as being malicious using the IP dissociation technique described herein. The requests may also be identified as malicious in other ways. For example, requests that generate internal server errors (e.g., HTTP response code 500 errors) may be malicious. The system, through an automated pattern extractor (which may itself be based on ML), may determine patterns common to requests identified as being malicious. The automated pattern extractor may analyze the malicious requests and extract a common pattern based on, for example, the payload of the request, the type of request, and/or parameters associated with the request (e.g., the user agent). The system may push rules based on the pattern to the proxy service, and for a given endpoint, payload, and/or uniform resource indicator (URI) path, the proxy layer may block requests that violate the rule.

Figure 1:
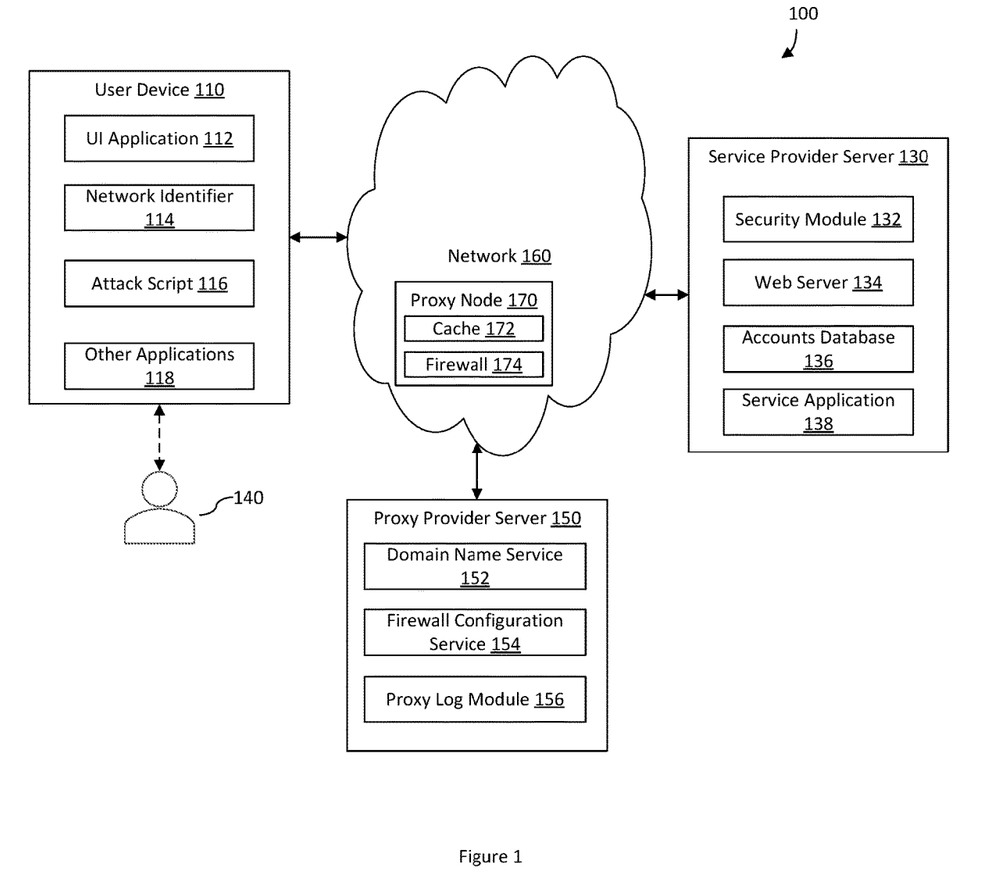
FIG. 1 is a block diagram illustrating an online security system according to an embodiment of the present disclosure.

FIG. 1 illustrates an online system 100 within which the security system may be implemented according to one embodiment of the disclosure. The online system 100 includes a service provider server 130 associated with a service provider, a user device 110, and a proxy provider server 150, each of which may be communicate with other components via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. The network 160 may include a number of proxy nodes 170, which may be controlled by the proxy provider server 150.

The user device 110, in one embodiment, may be utilized by a user 140 to interact with the service provider server 130 over the network 160. For example, the user 140 may use the user device 110 to log in to a user account with the service provider to access account services or conduct electronic transactions (e.g., account transfers or payments, purchase goods and/or services, sales of goods and/or services, receive payments of the sale, etc.) with the service provider server 130. Furthermore, the user 140 represented here may be a natural person, a group of people, a community, and/or a business entity. Examples of business entities include merchant sites, resource information sites, utility sites, real estate management sites, social networking sites, etc., which offer various items for purchase and process payments for the purchases.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., selling, shopping, purchasing, bidding, etc.) with the service provider server 130 over the network 160. In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in one embodiment, may include at least one network identifier 114, which may be, for example, an IP address (e.g., an IPv4 or IPv6 address) assigned to a network adapter at the user device. In various implementations, the network identifier 114 may be passed with a request to the service provider system 130 via the network 160, and the identifier 114 may be used by the service provider system 130 to associate the user with a particular user account (e.g., and a particular profile) maintained by the service provider system 130.

The user device 110 may, in some embodiments, particularly when in the control of a malicious actor, include an attack script 116. The attack script 116 may be an application designed to disable or impair services provided the service provider server 130, or to discover or exploit vulnerabilities in the service provider server 130. For example, the attack script 116 may (e.g., in combination with attack scripts 116 on other user devices 110) launch a DDoS attack against the service provider designed to take the service provider's website offline or impair the functionality of the website. The attack script 116 may send a large number of requests to the service provider server 130 in attempt to overwhelm the service provider server 130, preventing it from responding to requests from legitimate users, or taking it offline altogether. The attack script 116 may also be designed to try to gain access to the accounts of users serviced by the provider. After gaining access, the attacker may attempt to steal funds from the users' accounts or fraudulently place orders using the accounts. The attack script 116 may coordinate with attack scripts 116 on other user devices 110, each with their own network identifier 114, to issue requests to the service provider server 130. Instances of the attack script 116 may run independently on any number of user devices 110. In some instances, the script may run within the UI application 112 (e.g., within a web browser).

The user device 110, in various embodiments, may include other applications 118 as may be desired in one or more embodiments of the present disclosure to provide additional features available to the user 140. For example, the applications 118 may include security applications for implementing client-side security features, programmatic client applications for interfacing with appropriate application programming interfaces (APIs) over the network 160, and/or various other types of generally known programs and/or software applications. In still other examples, the other applications 118 may interface with the user interface application 112 for improved efficiency and convenience.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

Even though only one user device 110 is shown in FIG. 1, it has been contemplated that one or more user devices (each similar to user device 110) may communicate with other components via the network 160 within the system 100.

The service provider server 130, in one embodiment, may be maintained by an online service provider, which may provide services (e.g., selling of merchandise processing, performing electronic transactions, etc.). As such, the service provider server 130 may include a service application 138, which may be adapted to interact with the user devices (such as the user device 110) over the network 160 to facilitate the searching, selection, purchase, payment of items, and/or other services offered by the service provider server 130. In one example, the service provider server 130 may be provided by PayPal, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and may be configured to serve the log-in page to users for logging into user accounts of the users to access various service provided by the service provider server 130. The web server 134 may also include other webpages associated with the different services offered by the service provider server 130. As a result, a user (e.g., the user 140) may access a user account associated with the user and access various services offered by the service provider server 130, by generating HTTP requests directed at the service provider server 130. The web server 134 may also contain numerous web service endpoints configured to respond to particular types of requests. For example, the web server 134 may include an endpoint for login requests, an endpoint for new account requests, and an endpoint for account balance information requests.

The service provider server 130, in one embodiment, may be configured to maintain one or more user accounts (e.g., a buyer account, a seller account, etc.) in an account database 136, each of which may include account information associated with one or more users (e.g., the user 140 associated with user device 110). For example, account information may include private financial information of users and merchants, such as one or more account numbers, passwords, credit card information, banking information, digital wallets used, transaction history, or other types of financial information. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130 (e.g., in the accounts database 136), and the user may have credentials to authenticate or verify identity with the service provider server 130. Credentials may include an e-mail address or username, and a password. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

The service provider server 130 may also include a security module 132. The security module 132 may identify malicious traffic, detect patterns characteristic of malicious traffic and determine rules based on the patterns, and block, flag, or rate limit requests based on the rules. As disclosed herein, a service provider server 130 or proxy node 170 may be associated with multiple IP addresses. The service provider may periodically dissociate an IP addresses from a domain name associated with the service provider and continue receiving and logging requests to the dissociated IP address. The requests received while the IP address was dissociated would consist almost entirely of malicious traffic. The security module 132 may then create or update a list of IP addresses from which the malicious traffic originated and use the list as a block list (where requests from the IP addresses on the list or blocked). The security module 132 may block requests from IP addresses on the block list, or transmit the block list to a proxy service which may perform the blocking (e.g., at each proxy node 170 of the proxy service). The security module 132 may use the logged requests to train an ML model for identifying malicious traffic. The security module 132 may also analyze the malicious traffic to determine patterns characteristic of malicious requests. The security module 132 may create rules based on the patterns and block requests that violate the rules. The security module 132 may also dynamically push rules to a proxy service (e.g., via firewall configuration service 154 of the proxy provider server 150) which may block requests that violate the rules.

In an embodiment, the service provider may rely on a proxy service to handle traffic from user devices 110. For example, the service provider may use a CDN to provide responses to requests from user devices 110 faster than if the service provider server 130 were responding directly. Requests from a user device 110 to the service provider server 130 may be handled by a proxy node 170 in the network 160. For example, each proxy node 170 may be a CDN edge server. The proxy service may include a WAF to block requests based on a set of rules. A proxy provider server 150 may manage the proxy services for the service provider. The proxy provider server 150 may include a DNS 152, which may resolve requests for the domain name of the service provider to an IP address corresponding to a proxy node 170 (e.g., the proxy node 170 closest to the user device 110). The proxy provider server 150 may also include a firewall configuration service 154, allowing a service provider to configure rules for the WAF. For example, the security module 132 may dynamically transmit rules to the firewall configuration service 154, and the proxy provider server may configure the firewall 174 of each proxy node with the rules. The proxy provider server 150 may also include a proxy log module 156. The proxy log module 156 may provide request logs to the service provider server 130. The request logs may be gathered from the proxy nodes 170, and may include information about each request intended for the service provider server 130 received at a proxy node 170. The proxy nodes 170 may cache information from the web server 134 to provide faster responses to requests from the user device 110. The proxy nodes 170 may included a firewall configured to block malicious requests (e.g., by the firewall configuration service 154) based on rules provided by the security module 132.

Figure 2:
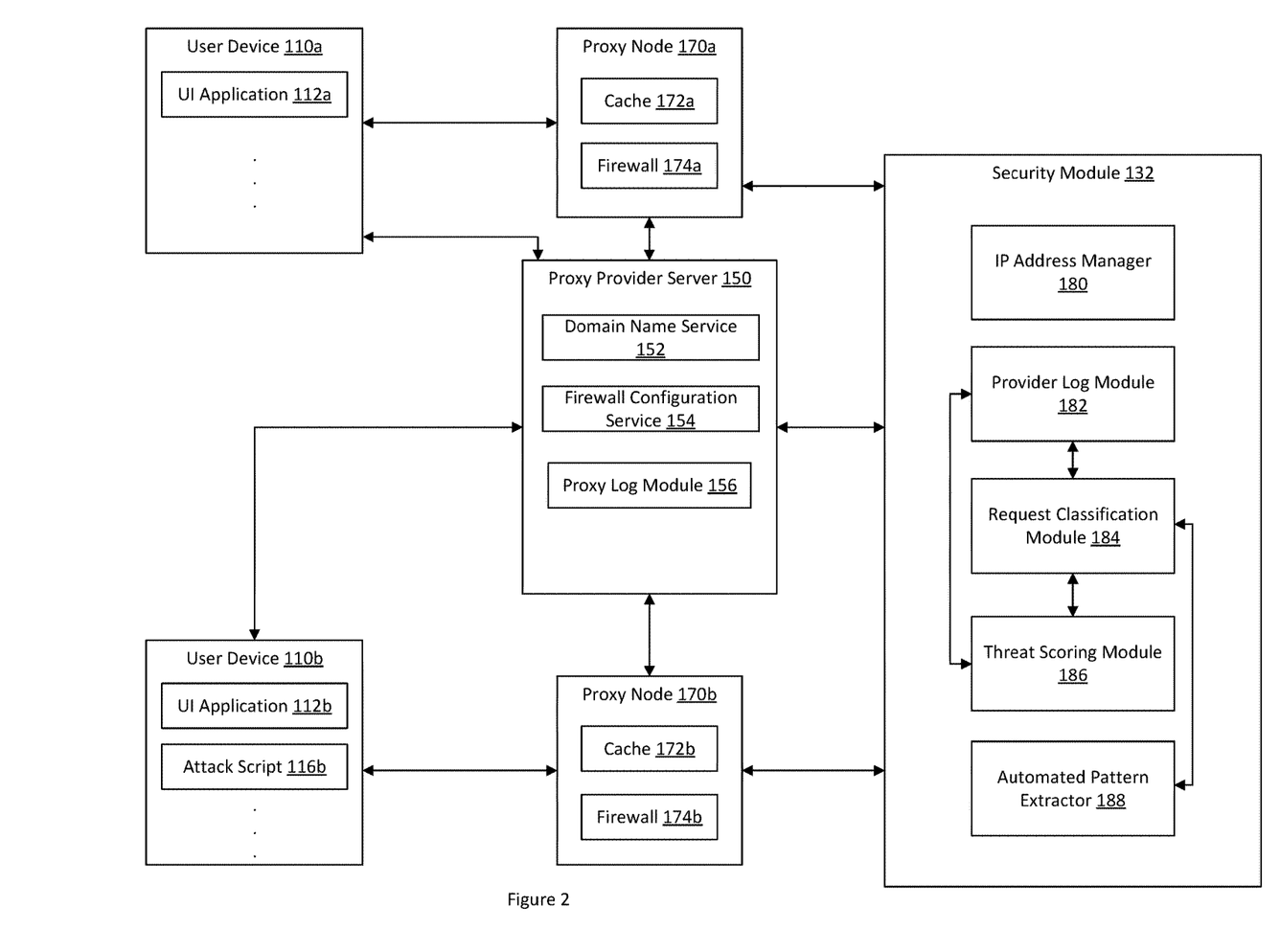
FIG. 2 is a block diagram illustrating a security module according to an embodiment of the present disclosure.

FIG. 2 illustrates a block diagram of the security module 132 interacting with other parts of system 100 according to an embodiment of the disclosure. The security module 132 includes an IP address manager 180, a provider log module 182, a request classification module 184, a threat scoring module 186, and an automated pattern extractor 188. The IP address manager 180 may handle dissociating IP addresses from, and associating of IP addresses with, the domain (i.e., the domain name) of the service provider. For example, the service provider may have more than one IP address associated with a domain. The IP addresses may be associated with (e.g., assigned to) the service provider server 160 and/or one or more proxy nodes 170. The service provider server 130 and/or proxy nodes 170 may each have one or more IP addresses assigned to them. The IP address manager 180 may periodically dissociate an IP an address from the domain, while still allowing the service provider server 130 (or a proxy node 170) to continue receiving and logging traffic at the dissociated IP address. After a period of time, the IP address manager 180 may re-associate the dissociated IP address with the domain. In this way, the service provider may rotate different IP addresses in and out of being associated with the domain. The IP address manager 180 may communicate with the proxy provider server 150 to associate and dissociate IP addresses.

The provider log module 182 may store log entries corresponding to requests at the service provider server 130 or a proxy node 170. For example, the provider log module may maintain a general request log, storing data about every request received by the service provider server 130 or a proxy node 170. The request log module may also store a malicious request log containing log entries related to requests directed to a dissociated IP address. The provider log module 182 may retrieve information regarding the log entries from the proxy log module 156 at the proxy provider server 150. For example, the proxy log module may stream log data (e.g., received from the proxy nodes 170) to the security module 132, and the log data may be processed and stored by the provider log module 182.

The threat scoring module 186 may assign a threat score to IP addresses (or other device identifier) from which requests are received. The threat scores may be used in determining whether to block or otherwise limit traffic from a particular device identifier (e.g., an IP address or device fingerprint). For example, each IP address associated with a request may initially have a threat score of 0 indicating minimal risk, but an IP address associated with a request in the malicious request log may be assigned a threat score of 10, indicating the highest level of risk.

The request classification module 184 may analyze the general log and malicious request logs to determine rules for blocking or otherwise limiting traffic. For example, the request classification module 184 may determine a rule to block traffic from any IP address or device identifier associated with a request in the malicious request log. The request classification module 184 may push the rule (with a block list containing IP address from the requests in the malicious request log) to the proxy provider server 150 (e.g., via the firewall configuration service 154). The request classification module 184 may also analyze the malicious request log and/or the general request log to determine patterns corresponding to malicious traffic. For example, the request classification module 184 may use the automated pattern extractor 180 to extract a common pattern based on the payload of the request, the type of request, and/or parameters associated with the request (e.g., the user agent). The request classification module 184 may push rules based on the pattern to the proxy service server 150 (e.g., via the firewall configuration service), and for a given endpoint, payload, and/or uniform resource indicator (URI) path, the proxy service may block or limit requests at each node 170 that violate the rule. The request classification module 184 may also include an ML module. The request classification module 184 may train the ML model to identify malicious traffic based on the data contained in the malicious request log. The ML model may determine patterns characteristic of malicious traffic, which the request classification module 184 may use in creating rules.

The proxy provider service 150 may contain a DNS 152, a firewall configuration service 154, and a proxy log module 156. The DNS 152 may resolve a domain name associated with the service provider server 160 to an IP address corresponding to a proxy node 170. For example, the user device 110a may issue a request via the UI application 112a directed at the domain name paypal.com. To resolve the domain name to an IP address, the UI application 112a may interact with a number of DNSs on the network 160 before reaching the DNS 152, which may be an authoritative DNS. The DNS 152 may resolve the domain name to the IP address of the proxy node 170a closest to the user device 110a. The request may then be directed to the proxy node 170a, which may log the request (and transfer the log or a log entry corresponding to the request to the proxy log module 156). The proxy node 170a may, based on rules configured at its firewall 174a (e.g., by the firewall configuration service 154), allow the request to proceed. The proxy node 170a may try to fulfill the request based on data in the cache 172a, and may, if the cache 172a does not contain the request data, contact the web server 134 of the service provider server 130 to retrieve the data. The proxy node 170a may then return a response including the data to the user device 110*a*. A similar request from the user device 110*b* via the UI application 112*b* may instead be resolved to the IP address of the proxy node 170*b*, which may be the closest proxy node 170 to the UI device 110*b*. As with proxy node 170*a*, proxy node 170*b* may log the request, allow the request through the firewall 174*b*, retrieve the data from its cache 172*b* (or from the web server 134 if the requisite data is not in the cache 172*b*), and respond to the user device 110*b*. In some instances, the user device 110*b* may send malicious requests from an attack script 116*b*. The attack script may store the IP address of the node 170*b* after the DNS 152 has resolved the domain name to the IP address of node 170*b* and issue requests directed at the stored IP address. Each request addressed directly to the stored IP address effectively circumvents the DNS 152, as no domain name resolution is necessary. If the security module 132 dissociates the stored IP address and the attack script 116*b* sends a request addressed to the dissociated IP address, proxy node 170*b* will receive the request, but not respond, resulting in attack script 116*b* receiving a request timeout response status code (e.g., 408). The proxy node 170*b* may then log the request (e.g., via the proxy log module 156, in the malicious request log). As described above, the request classification module 184 may determine a rule blocking requests from the IP address associated with user device 110*b* and push it to the proxy provider server 150 (e.g., via the firewall configuration service 154), which may push the rule to the firewall 174 at each node 170. Subsequent requests from device 110*b* may be blocked by the firewall 174*b* (or the firewall 174 of any proxy node 170 that receives the request), regardless of whether the request was addressed to the domain name or directly to an IP address. The firewall 174 of any proxy node 170 may be configured with a series of additional rules based on patterns determined by the request classification module 184 as described above and below. In response to a request from a user device 110 violating one of the rules, the firewall 174 may block or flag the request, or rate limit requests originating at an IP address or network identifier 114 of the user device 110.

Figure 3:
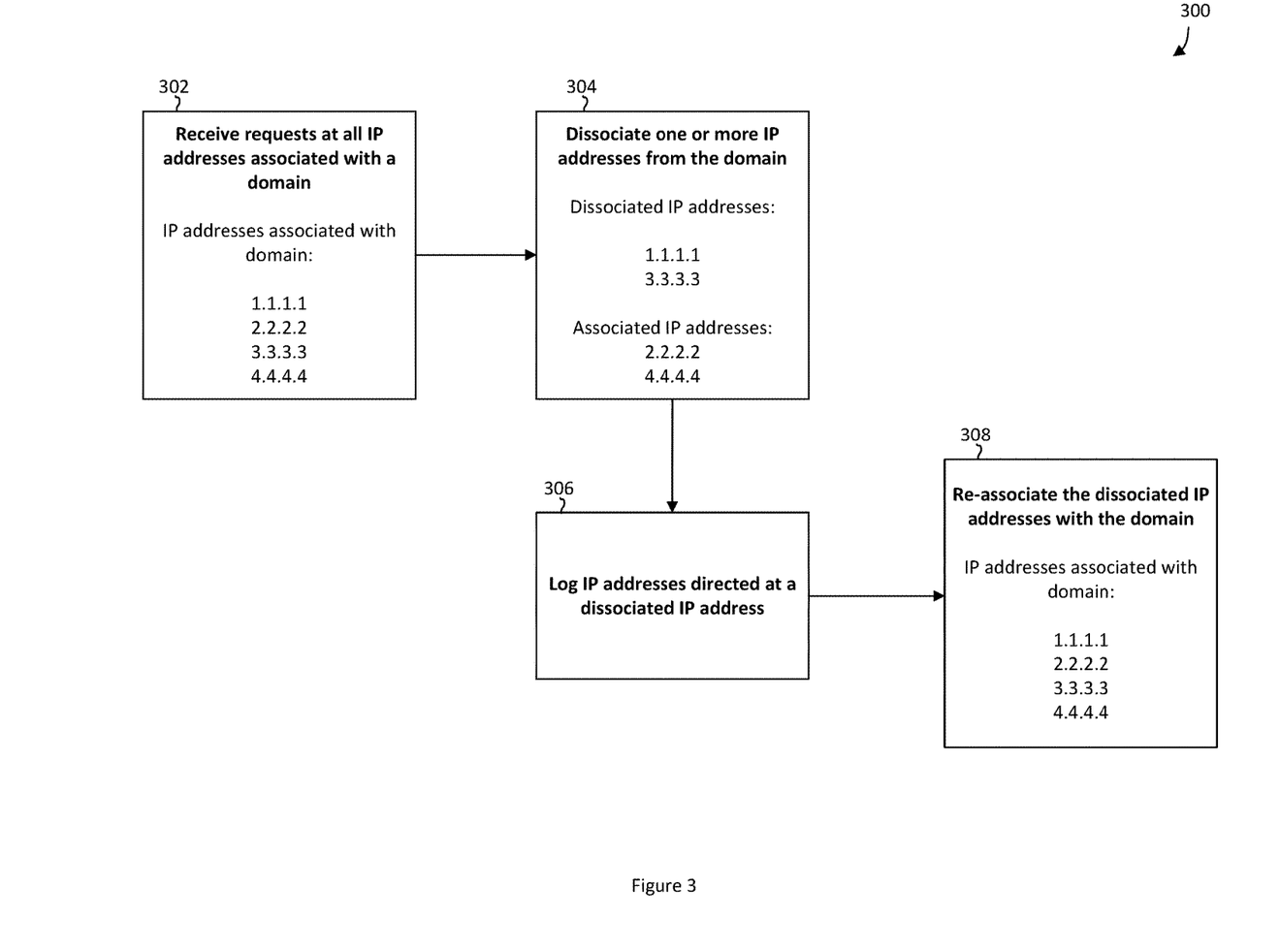
FIG. 3 illustrates a process for identifying malicious traffic according to various embodiments of the present disclosure.
Figure 4:
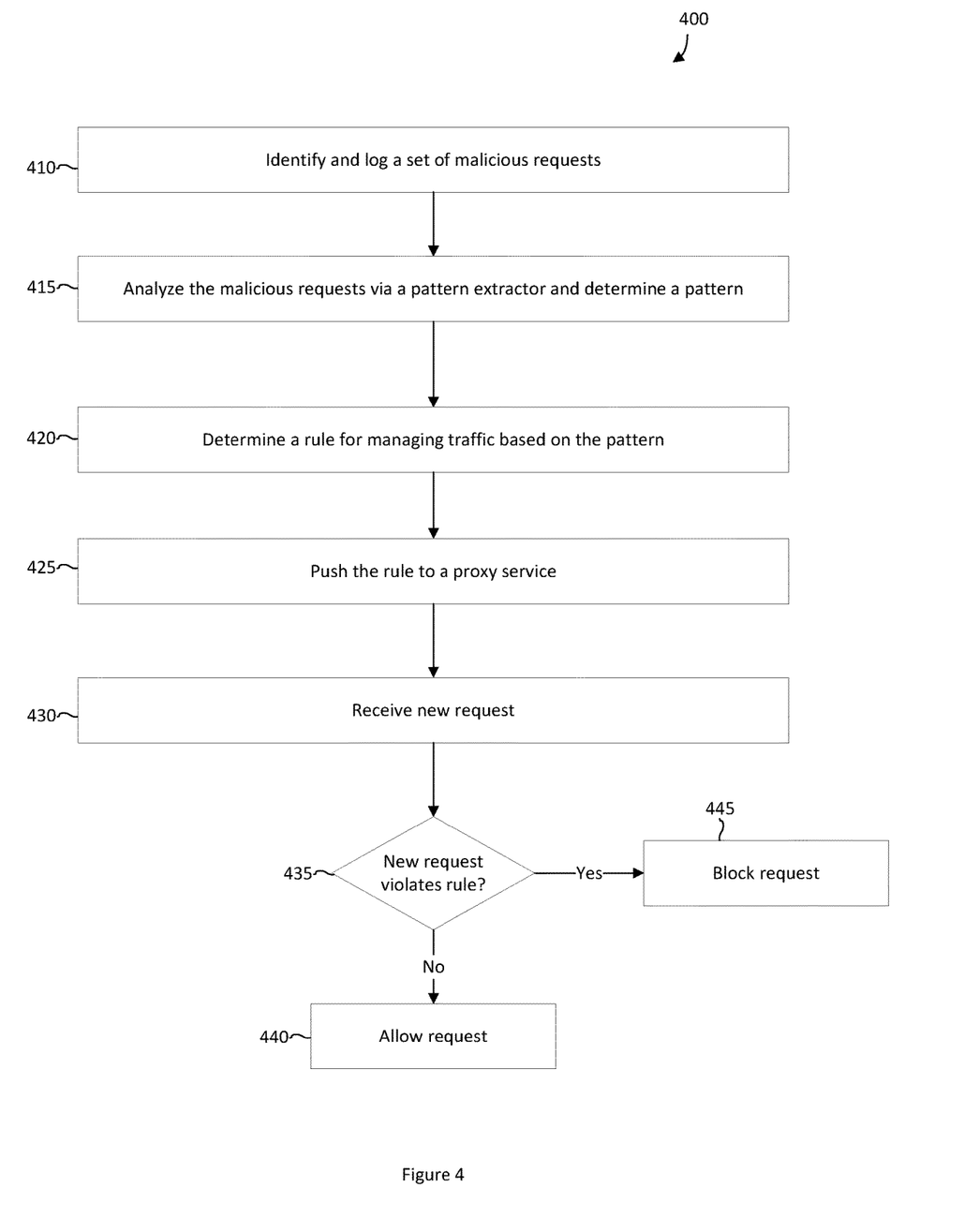
FIG. 4 is a flowchart showing a process of dynamically determining rules for identifying malicious requests and managing traffic in an online system.
Figure 5:
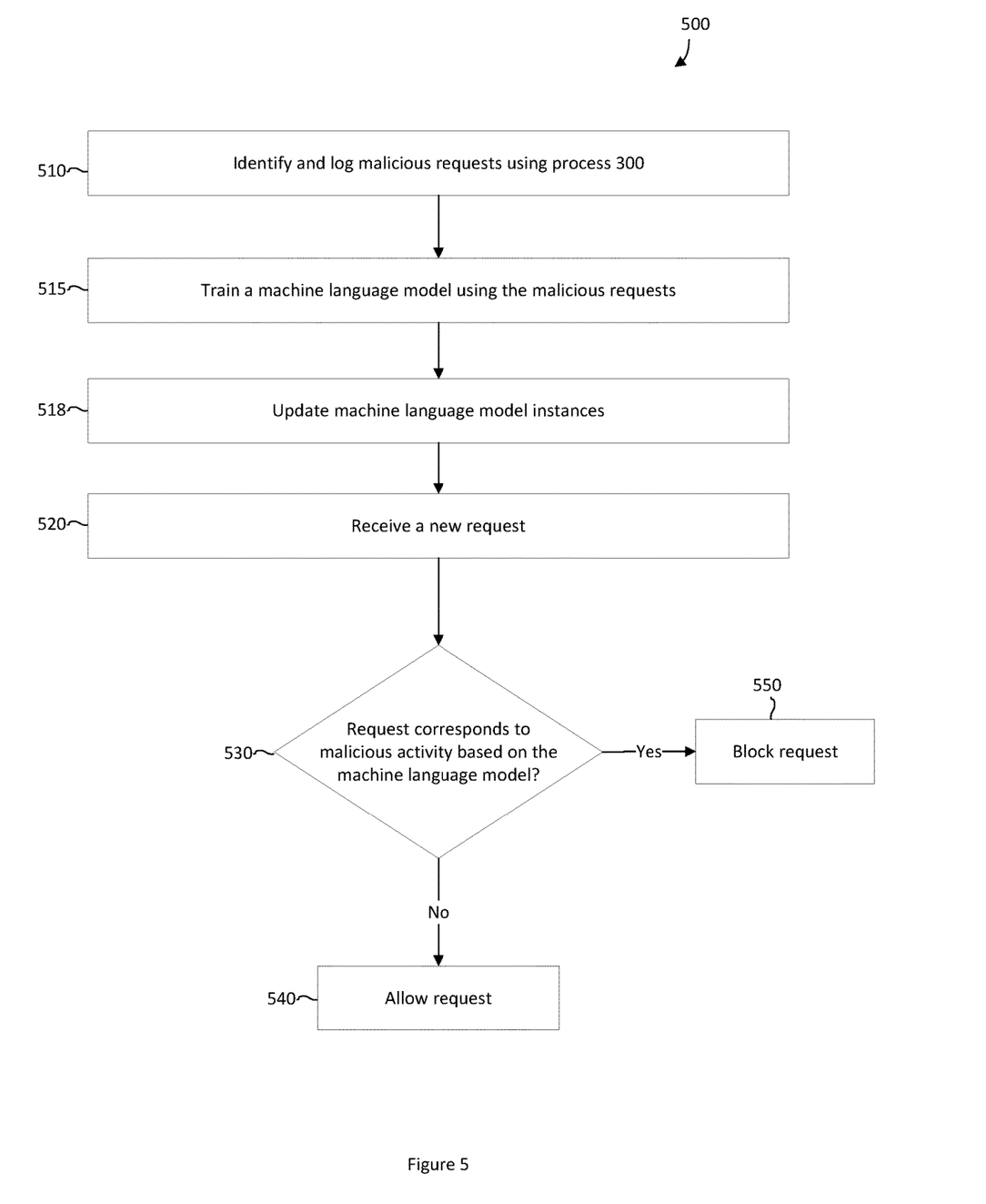
FIG. 5 is a flowchart showing a process for identifying malicious requests and managing traffic in an online system.

FIG. 3 illustrates a process 300 for fingerprinting (e.g., identifying with a very high degree of certainty) malicious traffic according to various embodiments of the disclosure. In some embodiments, the process may be performed by a security module 132. Note that the steps described below with respect to FIGS. 3-5 are also described above and can be performed in a different order, combined, or omitted as appropriate in different embodiments.

A service provider may have a set of one more IP address associated with domain (i.e., a domain name) under its control. Each of the IP addresses may be associated with (i.e., assigned to) a service provider server 130 and/or to proxy nodes 170 of a proxy service, where the service provider server 130 and/or the proxy nodes 170 may each be associated with multiple IP addresses. For simplicity, four IP addresses associated with the domain are illustrated, but fewer or more IP addresses are possible. The IP addresses shown are exemplary only.

At block 302, all of the IP addresses associated with the service provider are associated with the domain. For example, each of the four IP addresses may be associated with the paypal.com domain, 1.1.1.1 and 2.2.2.2 may be assigned to a first node 170 of a proxy service, and 3.3.3.3 and 4.4.4.4 may be assigned to a second node 170 of a proxy service. All traffic received by the first or second nodes, regardless of whether the traffic is addressed to the paypal.com domain or specifically to an IP address, may be handled and responded to by the first and second nodes 170. For example, requests to the first and second nodes 170 may be responded to based on data in the cache 172 (or based on data retrieved by the nodes 170 from the service provider server 130 if the data is not in the cache 172). Some requests to the first and second nodes 170 may be blocked based on rules in the firewall 174. Requests received at the nodes 170 may be logged by the nodes 170 and transmitted to the proxy log module 156, which may provide the log (e.g., as a batch transfer, or by streaming log entries as they arrive) to the provider log module 182. The provider log module 182 may store log entries associated with non-malicious requests in a general log.

At block 304, a subset of the IP addresses associated with the domain are dissociated (e.g., via the IP address manager 180) from the domain. For example, the IP addresses 1.1.1.1 (associated with the first node 170) and 3.3.3.3 (associated with the second node) are dissociated from the domain. The IP address manager 180 may dissociate the IP addresses as part of a scheduled job, where IP addresses are periodically dissociated and re-associated with the domain. In some embodiments the IP address manager 180 may dissociate the IP addresses by sending a request to the DNS 152 of the proxy provider server 150. The IP addresses 2.2.2.2 (associated with the first node) and 4.4.4.4 (associated with the second node) remain associated with the domain. When a request from a user device 110 directed to 2.2.2.2 or 4.4.4.4 arrives at the first or second node 170 respectively, the request is handled just as in block 302. However, when a request directed to 1.1.1.1 or 3.3.3.3 arrives at the first or second node 170 respectively, the first and second node 170 will not respond to the request. Since the IP addresses 1.1.1.1 and 3.3.3.3 were dissociated from the domain, any request to the paypal.com domain will be resolved by the DNS 152 to one of the still-associated IP address, i.e., 2.2.2.2 or 4.4.4.4. Any requests arriving via 1.1.1.1 or 3.3.3.3 after 1.1.1.1 and 3.3.3.3 were dissociated may reliably be assumed to be malicious and fingerprinted as such, since the request would have been specifically programmed (e.g., via an attack script 116) to target a specific IP address and circumvent the DNS 152. In some embodiments, the nodes 170 may continue to respond to malicious requests addressed to the dissociated IP addresses to elicit further requests (i.e., for logging and analysis) without compromising the security of the system. For example, the system may receive a request at 1.1.1.1 from a user device 110 requesting information about a user account. Rather than allowing the request to time out, the system (e.g., through the nodes 170 and/or the web server 134) may prepare a response with fictional information about a user. The user device 110 may then submit additional requests for user information, some of which the nodes 170 may respond to with more fictional information or allow to time out. Since the additional requests are directed to the dissociated IP addresses, they can be presumed malicious, giving the system a larger data set of requests reliably identifiable as malicious.

At block 306, the security module 132 may log (in a malicious request log) each request addressed to the dissociated IP addresses (1.1.1.1 and 3.3.3.3) after the IP addresses were dissociated. Each log entry may include the content of the request as well as information about the user device 110 from which the request originated. For example, the log entry may include the IP address from which the request originated, information obtained about the device via the user agent string included with the request, and information obtained about the device programmatically (e.g., via scripts executed in the UI application 112 or attack script 116 of the user device). The log entries may be transmitted by the proxy nodes 170 through the proxy log module 156 to the provider log module 182, either as a batch, or by streaming the log entries as they are created. Since the requests have been fingerprinted as malicious, the security module 132 (e.g., via the request classification module 184) may use data from the log as training and validation data for an ML model as discussed particularly with respect to FIG. 5. Similarly, the automated pattern extractor 188 may analyze the log for patterns, which can be used by the request classification module 184 to create rules for managing traffic as discussed particularly with respect to FIG. 4. The request classification module 184 may transmit the rules to the firewall configuration service 154, which may propagate them to the firewall 174 of the first and second proxy nodes 170. The firewalls 174 may then block or otherwise limit traffic based on the rules. Additionally, each IP address (or device fingerprint) associated with a request in the log may have its threat score increased (e.g., by the threat scoring module 186). The threat score may be used in determining whether to block or otherwise limit requests. For example, a request may be blocked if the threat score meets or exceeds a threshold, or if the threat score meets or exceeds the threshold and a particular rule is violated. In some embodiments the security module 132 may filter out requests originating from a shared IP address so that they are not included in the log. For example, the security module 132 (through the provider log module 180) may analyze requests received at block 302 (before 1.1.1.1 and 3.3.3.3 were dissociated) to determine if the IP address is shared. An IP address may be determined to be shared, for example, if different requests from the same IP address included different user agent strings. The ruled module 184 may compile the IP addresses from the malicious request log into a block list, create a rule indicating that requests originating from an IP address on the block list be blocked or otherwise limited, and transmit the rule to the firewall configuration service 154. The firewall configuration service 154 may propagate the rule to the firewall 174 of each of node 170 so that any requests from an IP address on the block list are blocked, regardless of which node they arrive at. In some embodiments, the blocklist may include device fingerprints (including, browser information, OS version, etc.) associated with each IP address so that the rule may block based on the combination of IP address and device fingerprint and prevent legitimate requests originating from a shared IP address from being blocked or otherwise limited.

At block 308, the dissociated IP addresses (e.g., 1.1.1.1 and 3.3.3.3) may be re-associated with the domain so that traffic is again handled as in 302, though potentially with new rules for the firewalls 174 based on the log of malicious traffic created in rule 308.

FIG. 4 illustrates a process 400 for dynamically determining rules for identifying malicious requests and managing traffic in an online system according to various embodiments of the disclosure. In some embodiments, the process may be performed by a security module 132.

At step 410, the process 400 may identify and log a set of potentially malicious requests. For example, the process 400 may employ the process 300 to compile a highly-accurate log of malicious requests by dissociating one or more IP addresses associated with a domain. Alternately, the process 400 may consider requests received at the service provider server 130 or a proxy node 170 and collect requests that may indicate malicious activity based on preidentified characteristics. For instance, the security module 132 may receive at the provider log module 182 a streaming log of requests received at proxy nodes 170 (e.g., via the proxy log module 156 of the proxy provider server 150). The request classification module 184, in cooperation with the provider log module 182, may collect requests suspected of malicious activity based on a given characteristic. For example, requests received at an endpoint may result in an unusually high number of internal server error responses (HTTP status response code 500), characteristic of an ongoing attack against the service provider server 130. Or the security module 132 may identify a collection of requests at a currency conversion endpoint, where each request is for a very small amount of money (e.g., 2 cents), indicating than an attacker may be trying to exploit a currency rounding operation at the endpoint (e.g., rounding currency up the nearest cent) using a very large number of requests for small currency conversions. Or the security module 132 may identify a large number of requests at endpoint with substantially similar user agents that have small variations. For example, the requests may include as the browser in the user agent "Headless Browser 123.abc", "Headless Browser 123.def", "Headless Browser 456.xyz", etc., indicating that the browser string is being programmatically modified for different IP addresses controlled by an attacker. Each of these characteristics may be preconfigured at the security module 132 (e.g., by a human analyst) so that the security module may monitor incoming traffic for the characteristics and collect and group the suspicious requests based on the characteristics.

At step 415, the process may analyze the malicious requests and determine a pattern common to the requests. The requests may be analyzed at the application layer (i.e., layer 7 of the OSI model), giving the security module 132 full access to the content of the request (e.g., payload, parameters, user agent string, etc.). For example, the request classification module 184 may group all requests resulting in an internal server error as described in step 410 and the automated pattern extractor 188 may analyze the requests to determine a pattern. In some embodiments, the automated pattern extractor 188 may analyze the payload of each request to find a common string or data. For example, a large number of the requests resulting in an internal server error may be of the form "paypal.com/example/?token=12345&id=987 . . . ", where "token=12345&id=987" is the payload. The automated pattern extractor 188 may then determine a pattern indicating that the payload "token=12345&id=987" included in a request is characteristic of malicious activity. As another example, the automated pattern extractor 188 may analyze requests received at the currency conversion endpoint as described in step 410. The automated pattern extractor 188 may be configured to find common parameters in the request, or a large number of requests to convert between the same two currencies. For example, a large number of requests at the currency conversion endpoint may include a unique identifier (e.g., "authorization_code:ABCDEFG"), or may request conversion between the same two currencies (e.g., from the Danish krone to the Brazilian real). The automated pattern extractor 188 may then determine that a pattern where the authorization code is "ABCDEFG" or the conversion is between Danish krones and Brazilian reals is indicative of malicious traffic when the amount to be converted is fewer than 2 cents. As another example, the automated pattern extractor 188 may be configured to find similarities in user agent strings. The automated pattern extractor 188 may determine that the pattern "Headless Browser" followed by three digits, followed by period, followed by three letters is indicative of abusive behavior. In some embodiments, the pattern may be based on a sequence of requests rather than a single request. For example, the automated pattern extractor 188 may be configured to detect a sequence of requests involving visiting a specific merchant's storefront, adding a specific same item to a shopping cart, visiting a checkout page, and attempting to pay with a different, likely invalid credit card each time. Each request in the sequence may be associated with a URI (e.g., merchant.com/shop, merchant.com/shop/addItem?id=2, merchant.com/shop/checkout, merchant.com/shop/addcard), so that the pattern extractor may determine a pattern that indicates each URI being visited in sequence.

At step 420, process may determine a rule (e.g., using the request classification module 184) for managing traffic based on the pattern determined at step 415. For example, the request classification module 184 may determine a rule specifying that requests including a certain payload (e.g., "token=12345&id=987") should be blocked. The request classification module 184 may also determine that requests including a certain parameter (e.g., "authorization_code: ABCDEFG") directed at a specific endpoint be blocked. In some instances, a pattern may be indicative of abuse, but creating a rule that blocks requests based simply on the pattern may block legitimate traffic as well. For example, as described in step 415, the automated pattern extractor 188 may determine that a pattern of converting between Danish krones and Brazilian reals indicates abuse when the amount to be converted is less than 5 cents. But there may be legitimate requests to convert between the two currencies that may be blocked by broad rule based on the pattern. Hence, the request classification module 184 may craft a rule the specifies that requests including the pattern of converting between krones and reals for an amount less than 5 cents be blocked only if the threat score associated with the IP address or device fingerprint from which the request originated exceeds a threshold. In other words, the rules may include patterns as well as conditions that must be satisfied before any action is taken. The rules may also provide other consequences besides blocking. For example, a rule may provide that requests matching a pattern must be challenged (e.g., via a CAPTCHA or other puzzle) before the request is fulfilled. The rule may also indicate that requests matching the pattern should be rate limited rather than immediately blocked. For example, the rule may provide that if the number of requests matching the pattern over a time interval meets or exceeds a rate limit (e.g., 20 requests matching the pattern/minute), further requests matching the pattern should be blocked for a period of time.

In some embodiments, the process 400 may train an ML model using the information logged at step 410 to determine the rule or update an existing rule. The ML model may be part of the request classification module 184. The ML model may be configured with rules for managing traffic, such as those described above. For example, the rules may block, flag, or rate limit requests at the application layer (i.e., layer 7 of the OSI model) based on a pattern. The ML model may be trained by applying a rule designed to identify malicious requests to the known malicious requests logged at step 410 and determining which, if any, of the logged malicious requests the rule failed to identify. The process 400 (e.g., using the request classification module 184) may update the rule or create an additional rule based on the malicious requests the rule failed to identify. For example, the rule may be configured to identify requests that include "Headless Browser 123.abc" in the user agent as malicious. The requests logged at step 410 may include a number of requests that include the indicated "Headless Browser 123.abc" in the user agent, but may also include a number of requests that include "Headless Browser 123.xyz" and "Headless Browser 567.abc". As the logged requests were received at a dissociated IP address, they can—with near certainty—be identified as malicious, so that any requests including "Headless Browser 123.xyz" and "Headless Browser 567.abc" in the user agent may be identified as malicious. The process 400 may collect the malicious requests that the rule failed to identify and a determine a pattern (e.g., using the automated pattern extractor 188) common to the requests. The process 400 may then update the rule based on the pattern so that the rule would also catch requests with "Headless Browser 123.xyz" and "Headless Browser 567.abc" in the user agent. For example, the pattern extractor may determine that the pattern is the regular expression "(Headless\ Browser\ \d\d\d\.\w\w\w)", where the regular expression matches strings that begin with "Headless Browser", followed by a space, followed three digits, followed by three letters. The request classification module 184 may then update the rule, replacing the previous pattern ("Headless Browser 123.abc") with the regular expression.

At step 425, the process may enable the rule by pushing it to the proxy service. For example, the request classification module 184 may push the rule to the proxy service via the firewall configuration service 154, which may propagate the rule to each proxy node 170 (via the firewall 174 at each proxy node 170). In some embodiments, the rule may be pushed to the proxy node 170 in stage or flag mode, where violations of the rule will not result in a block. Instead, the proxy node 170 may log information about each request that violates the rule (e.g., through the proxy log module 156) for transmission to the request classification module 184, which may analyze the information and determine whether to enable the rule (e.g., based on the number of requests that were flagged as violating the rule). Alternately, a human analyst may review the information and determine whether the rule should be enabled. In some embodiments, multiple patterns may be combined into a bandwagon rule and pushed to the proxy service at once.

At step 430, the process may receive a new request (e.g., at any of the proxy nodes 170), and at step 435, the process may determine (through the firewall 174) if the new request violates the rule determined at step 420. For example, the firewall 174 may determine whether the IP address and/or device fingerprint from which the request originated is in the block list gathered according to process 300. In some embodiments, the firewall 174 may determine that the request violates the rule by determining that the payload associated with the request matches the pattern indicated by the rule. The firewall 174 may also determine that the rule has been violated based on a parameter or identifier of the request matching the pattern. For example, the rule may indicate that any requests including a string in the user agent that matches the regular expression "(Headless\ Browser\ \d\d\d\.\w\w\w)" should be identified as malicious. If the new request includes the string "Headless Browser 000.mmm", the firewall 174 will determine that the request is malicious. The firewall 174 may also determine that the rule has been violated based on a sequence of requests. For example, as described at step 415, the pattern may indicate that a specific sequence of requests to different URIs have originated from the same IP address and/or device fingerprint. The firewall 174 may determine, based on log information, that a number of requests matching those in the sequence have been issued by the same IP address and/or device fingerprint, and that the new request matches the final request in the sequence, violating the rule.

In some embodiments, whether the request violates the rule may be based both on the pattern associated with the rule and one or more additional conditions. For example, the rule may indicate that it is violated only if the new request matches the pattern and the IP address and/or device fingerprint is associated with a threat score at or above a threshold. Or the rule may indicate that the request is to be blocked only if directed at a specific endpoint. If the firewall 174 determines that the new request does not violate the rule, the process may proceed to step 440 where the request is allowed. Otherwise, the process may continue to step 445.

At step 445, the new request is blocked by the firewall 174 and further action may be taken against the IP address and/or device fingerprint from which the new request originated. For example, further requests from IP address and/or device fingerprint from which the new request originated may be blocked for a period of time. If the rule was pushed to the proxy service in stage or flag mode, the firewall 174 may instead flag the request rather than blocking it, for further analysis by the request classification module 184 or a human analyst. If the rule indicates a rate limit, the firewall 174 may block the new request if it determines the number of requests matching the pattern indicated by the rule has met or exceeded the rate limit.

FIG. 5 illustrates a process 500 for identifying malicious requests and managing traffic in an online system according to various embodiments of the disclosure. In some embodiments, the process may be performed by a security module 132. The process 500 begins at step 510, where the process 500 may identify and log a set of malicious requests using the process 300 (i.e., by dissociating an IP address from a domain and logging requests received via the IP address after the dissociation).

At step 515, the process 500 may train an ML model using the information logged at step 510. In some embodiments, the ML model may be part of the request classification module 184 and may be transmitted to the proxy service (e.g., to be propagated to proxy nodes 170 for use by the firewalls 174). The ML model may be configured to determine whether a request is malicious, for example, based on patterns as described above with respect to process 400. The firewalls 174 may block, flag, or rate limit requests at the application layer (i.e., layer 7 of the OSI model) based on determinations made by the ML model that the requests are associated with malicious activity. The patterns may correspond, for example, to the payload of the request, parameters or identifiers associated with the request, or a sequence of requests to various URIs. The ML model may include a learning algorithm for identifying patterns (e.g., using the automated pattern extraction module 188) associated with malicious traffic in a training set. For example, the ML model may already be configured to identify requests that include "Headless Browser 123.abc" in the user agent as malicious. The requests logged at step 510 may include a number of requests that include the indicated "Headless Browser 123.abc" in the user agent, but may also include a number of requests that include "Headless Browser 123.xyz" and "Headless Browser 567.abc". As the logged requests were received at a dissociated IP address, they can—with near certainty—be identified as malicious, so that any requests including "Headless Browser 123.xyz" and "Headless Browser 567.abc" in the user agent may be identified as malicious. The ML model, through the learning algorithm, may determine a pattern (e.g., using the automated pattern extractor 188) common to the requests and update the ML model so that the model would also catch requests with "Headless Browser 123.xyz" and "Headless Browser 567.abc" in the user agent. For example, the learning algorithm (via the automated pattern extractor 188) may determine that the pattern is the regular expression "(Headless\ Browser\ \d\d\d.\w\w\w)", where the regular expression matches strings that begin with "Headless Browser", followed by a space, followed three digits, followed by three letters. The ML model may then update the pattern it employs to detect malicious requests of this kind, replacing the previous pattern ("Headless Browser 123.abc") with the regular expression.

At step 518, the process 500 may update the ML model at the proxy service to match the updated model determined by the request classification module 184 at step 515. For example, the request classification module 184 may push the updated ML model to the proxy service via the firewall configuration service 154, which may propagate the updated ML model to each proxy node 170 (via the firewall 174 at each proxy node 170).

At step 520, the process 500 may receive a new request (e.g., from a user device 110), and at step 530, the process may determine whether the request corresponds to malicious activity based on the ML model. The firewall 174 may apply the ML model to the new request to have the ML model classify the request as malicious or non-malicious. For example, the firewall 174 may apply ML model to determine that the new request is malicious by determining that the payload associated with the new request matches a pattern determined by the ML model to be associated with malicious activity. The firewall 174 may also apply the ML model may to determine that the request is malicious based on a parameter or identifier of the new request matching the pattern. The firewall 174 may also apply the ML model to determine that the request is malicious based on a sequence of requests that includes the new request. Continuing the example described in step 515, the pattern determined by the ML model may indicate that any requests including a string in the user agent that matches the regular expression "(Headless\ Browser\ \d\d\d\.\w\w\w)" should be identified as malicious. If the new request includes the string "Headless Browser 000.mmm", the ML model will determine that the request is malicious. In some embodiments whether the ML model determines the request to be malicious may be based both on a pattern and one or more additional conditions. For example, the ML model may determine the request to be malicious only if the new request matches the pattern and the IP address and/or device fingerprint is associated with a threat score at or above a threshold. Or the ML model may determine the request to be malicious only if directed at a specific endpoint. In some embodiments, the ML model may be further trained by the request classification module 184 using requests determined to be malicious at this step. For example, each malicious request may be logged by the firewalls 174, and the proxy log module 156 may transmit the logs to the provider log module 182. The request classification module 184 may then train the ML model with the newly logged malicious requests. The ML model may identify (e.g., using the automated pattern extractor 188) additional patterns characteristic of malicious activity beyond those used the by ML model in making the initial determination that the request was malicious and update itself to consider the additional patterns in future determinations. The request classification module 184 may propagate the updated ML model to the proxy service as described above in step 518. If the firewall 174 determines that the new request does not violate the rule (i.e., by applying the ML model to the request), the process may proceed to step 540 where the request is allowed. Otherwise, the process continues to step 550.

At step 550, the new request is blocked by the firewall 174 and further action may be taken against the IP address and/or device fingerprint from which the new request originated. For example, further requests from IP address and/or device fingerprint from which the new request originated may be blocked for a period of time. If a rate limit is effect, the firewall 174 may block the new request if it determines the number of requests matching the pattern indicated by the rule has met or exceeded the rate limit.

Figure 6:
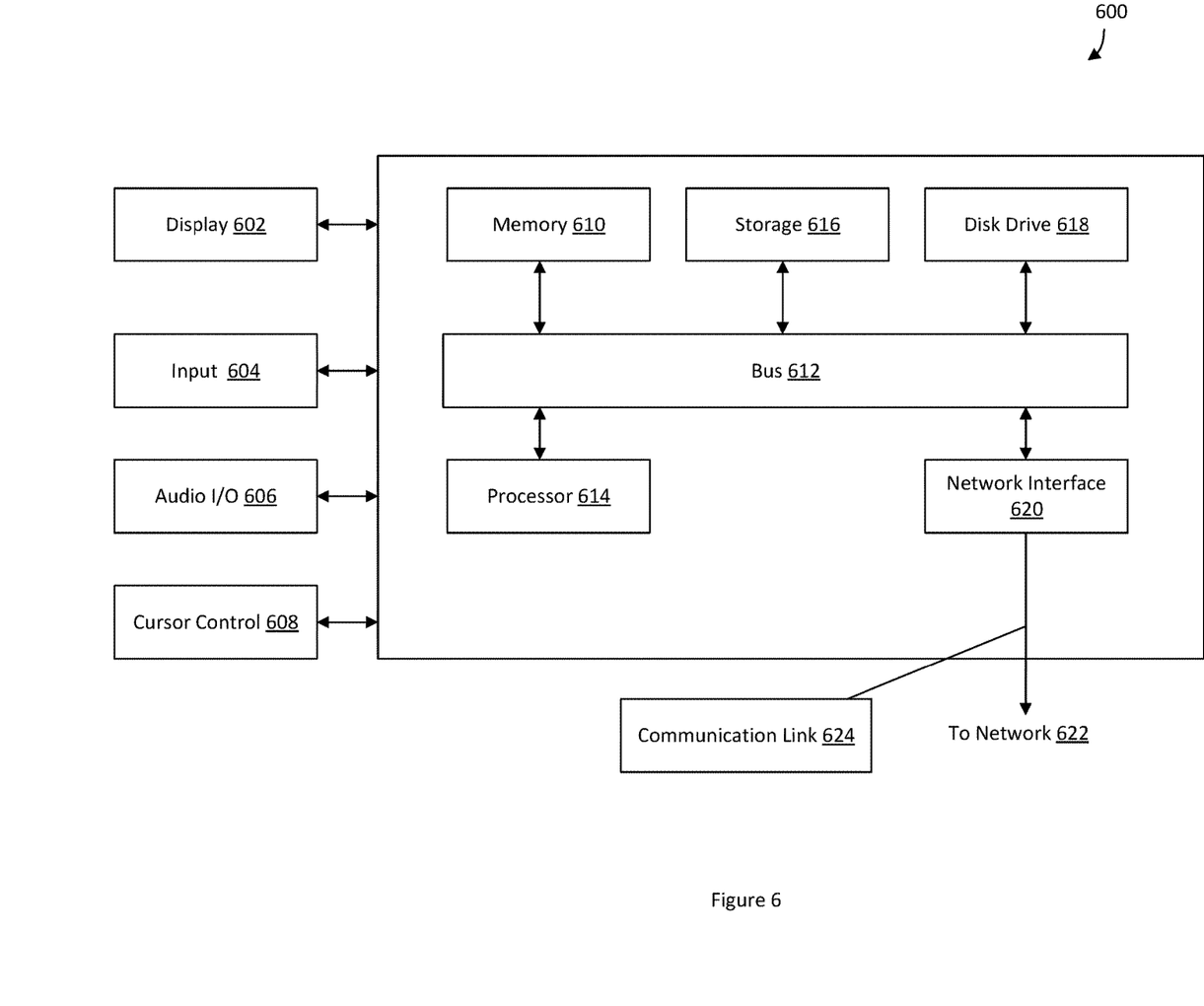
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130 and the user device 110. In various implementations, the user device 110 may include a mobile cellular phone, personal computer (PC), laptop, wearable computing device, etc. adapted for wireless communication, and the service provider server 130 may include a network computing device, such as a server. Thus, it should be appreciated that the devices 110 and 130 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via network 622. For example, the network interface 620 may transmit or receive requests from the attack script 116. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 700 performs specific operations by the processor 614 and other components by executing one or more sequences of instructions contained in the system memory component 610. For example, the processor 614 can perform the security functions described herein according to processes 300, 400, and 500.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
    a memory; and
    one or more hardware processors coupled with the memory and configured to read instructions from the memory to cause the system to perform operations comprising:
        temporarily dissociating, by a service provider, an IP address of the service provider from a domain of the service provider, wherein the domain is associated with one or more nodes;
        receiving, at a first node of the one or more nodes, a set of one or more requests associated with the temporarily dissociated IP address, wherein the set of one or more requests is determined to be associated with malicious activity based on being associated with the temporarily dissociated IP address;
        reassociating, after the set of one or more request is determined to be associated with the malicious activity, the IP address with the domain;
        training a machine learning model utilizing log information corresponding to the set of one or more requests, wherein the training includes determining one or more patterns corresponding to the malicious activity;
        receiving, at any of the one or more nodes, a new request corresponding to a first information;
        determining whether the new request corresponds to malicious activity based on using the machine learning model to analyze the first information and determine if the first information corresponds to the one or more patterns; and
        blocking the new request based on determining that the new request corresponds to the malicious activity.

2. The system of claim 1, wherein the training the machine learning model comprises:
    applying a rule to the set of one or more requests, wherein the rule is designed to identify requests associated with the malicious activity;
    determining that the rule failed to identify one or more requests of the set as being associated with malicious traffic; and
    updating the rule based on the one or more requests when the rule failed to identify the one or more requests as being associated with the malicious traffic.

3. The system of claim 1, wherein the IP address is a first IP address, the domain is associated with a second IP address, and the operations further comprise: repeating, for the second IP address, the dissociating, the receiving the set of one or more requests, and the associating.

4. The system of claim 1, wherein the new request is received at a first endpoint, and the operations further comprise:
    determining that a first pattern of the one or more patterns is associated with the first endpoint; and
    blocking, based on the first information corresponding to the first pattern and on the new request being received at the first endpoint, the new request.

5. The system of claim 1, wherein the new request is associated with a source IP address, the source IP address is associated with a threat score, and the operations further comprise:
    increasing the threat score associated with the source IP address in response to determining that the new request corresponds to the malicious activity.

6. The system of claim 5, wherein the operations further comprise:
    transmitting, in response to the threat score meeting or exceeding a threshold, a challenge to a device associated with the source IP address;
    receiving a response to the challenge from the device;
    determining a validity of the response; and
    blocking, in response to determining the response is not valid, the new request.

7. The system of claim 1, wherein a pattern of the one or more patterns corresponding to the malicious activity is based on a user agent associated with one or more requests of the set of one or more requests.

8. The system of claim 1, wherein a pattern of the one or more patterns corresponding to the malicious activity is based on a payload associated with one or more requests of the set of one or more requests.

9. The system of claim 6, wherein the challenge comprises a Completely Automated Public Turing test to tell Computers and Humans Apart (CAPTCHA).

10. A method, comprising:
    receiving, at a first node of one or more nodes associated with a domain of a service provider, the first node associated with a first IP address of the service provider associated with the domain, a first set of one or more requests, wherein each request in the first set is associated with a source IP address;
    temporarily dissociating, by the service provider, the first IP address from the domain;
    receiving, at the first node, a second set of one or more requests, each request of the second set associated with the temporarily dissociated IP address and the source IP address, wherein each request of the second set is associated with malicious activity based on being associated with the temporarily dissociated IP address;
    reassociating the first IP address with the domain;
    creating or updating a list of IP addresses associated with the malicious activity comprising source IP addresses associated with the requests of the second set of one or more requests; and
    blocking requests originating from an IP address on the list of IP addresses associated with the malicious activity;
    wherein at least one of the receiving the first set of one or more requests, the temporarily dissociating, the receiving the second set of one or more requests, the reassociating, or the creating or updating the list of IP addresses is performed via one or more hardware processors.

11. The method of claim 10, further comprising:
    rate limiting requests originating from an IP address on the list of IP addresses associated with the malicious activity.

12. The method of claim 10, further comprising:
    flagging requests originating from an IP address on the list of IP addresses associated with the malicious activity.

13. The method of claim 10, further comprising:
    determining that a first source IP address associated both with a request in the first set of one or more requests and a request in the second set of one or more requests is shared by two or more devices; and
    excluding, based on the determining, the first source IP address from the list of IP addresses associated with the malicious activity.

14. The method of claim 13, wherein each of the two or more devices is associated with a device fingerprint, and the determining is based on the device fingerprint of each of the two or more devices.

15. The method of claim 10, further comprising:

detecting abusive traffic patterns using a machine learning model trained based on the list of IP addresses.

16. A non-transitory machine-readable medium having stored thereon machine-readable instructions executable to cause a machine to perform operations comprising:

temporarily dissociating, by a service provider, an IP address of the service provider from a domain of the service provider, wherein the domain is associated with one or more nodes;

receiving, at a first node of the one or more nodes, a set of one or more requests associated with the temporarily dissociated IP address, wherein each request in the set is determined to be associated with malicious activity based on being associated with the temporarily dissociated IP address;

reassociating the IP address with the domain;

logging, at a log, each request of the set;

analyzing, via an automated pattern extractor, the log;

determining, based on the analyzing, a pattern indicating the malicious activity;

determining, based on the pattern, a rule for managing traffic, wherein the rule comprises a rule for blocking requests associated with the malicious activity; and pushing, to a proxy service associated with the domain, the rule.

17. The non-transitory machine-readable medium of claim 16, wherein the operations further comprise:

receiving, at any node of the one or more nodes, a new request including a user agent, wherein the user agent indicates a first web browser;

detecting, using a script, a second web browser from which the new request originated;

determining that the first and second web browsers are different; and blocking, by the proxy service, the new request based on the determining that the first and second web browser are different.

18. The non-transitory machine-readable medium of claim 16, wherein the operations further comprise:

receiving, at any node of the one or more nodes, a second set of one or more requests associated with a device identifier common to every request in the second set;

determining that a number of requests of the second set are invalid;

determining that the number of invalid requests exceeds a rate limit indicating a number of permissible invalid requests over a period of time; and blocking, in response to the determining that the rate limit has been exceeded, further requests originating from the common device identifier.

19. The non-transitory machine-readable medium of claim 18, wherein the device identifier comprises at least a device fingerprint associated with the device.

20. The non-transitory machine-readable medium of claim 16, wherein the operations further comprise:training a machine learning model, wherein a determination that each request in the set associated with the malicious activity is made at least in part using the trained machine learning model.

* * * * *